United States Patent
Henderson

(10) Patent No.: US 11,623,497 B2
(45) Date of Patent: Apr. 11, 2023

(54) DUAL HEAT PUMP AND FURNACE OPERATION FOR A RECREATIONAL VEHICLE

(71) Applicant: Haier US Appliance Solutions, Inc., Wilmington, DE (US)

(72) Inventor: Richard Dustin Henderson, LaGrange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 146 days.

(21) Appl. No.: 17/070,473

(22) Filed: Oct. 14, 2020

(65) Prior Publication Data

US 2022/0111700 A1    Apr. 14, 2022

(51) Int. Cl.
*B60H 1/00* (2006.01)
*B60H 1/22* (2006.01)

(52) U.S. Cl.
CPC ..... *B60H 1/00735* (2013.01); *B60H 1/00364* (2013.01); *B60H 1/00878* (2013.01); *B60H 1/00907* (2013.01); *B60H 1/22* (2013.01); *B60H 1/2203* (2013.01); *B60H 1/2206* (2013.01); *B60H 2001/2228* (2013.01)

(58) Field of Classification Search
CPC ............ B60H 1/00735; B60H 1/00364; B60H 1/00878; B60H 1/00907; B60H 1/22; B60H 1/2203; B60H 1/2226; B60H 2001/2228
See application file for complete search history.

(56) References Cited

U.S. PATENT DOCUMENTS

| 2,847,190 A * | 8/1958 | Slattery .................. F25B 13/00 165/242 |
| 6,464,000 B1 | 10/2002 | Kloster |
| 7,089,955 B1 | 8/2006 | Komro, Sr. |
| 2003/0230633 A1 | 12/2003 | Murgu |
| 2007/0295017 A1* | 12/2007 | Pannell .............. B60H 1/00364 62/239 |
| 2012/0091214 A1 | 4/2012 | Rixen |
| 2014/0298838 A1* | 10/2014 | Morishita .......... B60H 1/00921 62/151 |
| 2017/0008407 A1* | 1/2017 | Porras ................ B60H 1/00278 |
| 2019/0077225 A1* | 3/2019 | Nakamura ........... B60H 1/2221 |

OTHER PUBLICATIONS

Coleman Mack High Performance Heat Pump, 2 pages.

* cited by examiner

*Primary Examiner* — Marc E Norman
(74) *Attorney, Agent, or Firm* — Dority & Manning, P.A.

(57) ABSTRACT

An air conditioning unit for a recreational vehicle including a first heater and a second heater, and configured to initiate a heating operation including analyzing an interior temperature and an exterior temperature, determine an operating mode of the air conditioning unit, and controlling the first heater and the second heater according to the determined operation mode.

16 Claims, 4 Drawing Sheets

DUAL HEAT PUMP AND FURNACE OPERATION FOR A RECREATIONAL VEHICLE

FIELD OF THE INVENTION

The present subject matter relates generally to air conditioners in recreational vehicles, and more particularly to operation modes for air conditioner units.

BACKGROUND OF THE INVENTION

Certain recreational vehicles include an air conditioning system, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. Some air conditioning units may include auxiliary heaters which provide assistance in heating under certain heavy loads.

Conventional RVACs that include a primary heater and an auxiliary heater require particular operations and manual controls to initiate an operation of the auxiliary heater. For instance, a user may have to manually select the auxiliary heater when a particular instance dictates its use. Accordingly, an improved air conditioning unit and method of use would be useful. More specifically, an RVAC that automatically activates and deactivates both a primary and an auxiliary heater would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an air conditioning unit for a recreational vehicle is provided. The air conditioning unit may include a controller, a sealed system operably coupled to the controller and configured for circulating refrigerant, the sealed system comprising a first heater to provide heat to the recreational vehicle, a second heater operably coupled to the controller and attachable to the recreational vehicle to selectively provide auxiliary heat to the recreational vehicle, an interior temperature sensor operably coupled to the controller to sense an interior temperature of the recreational vehicle, and an ambient exterior temperature sensor operably coupled to the controller to sense an ambient exterior temperature outside the recreational vehicle. The controller may be configured to initiate a heating operation including analyzing the interior temperature of the recreational vehicle, analyzing the ambient exterior temperature outside the recreational vehicle, determining an operating mode of the air conditioning unit based on the interior temperature and the ambient exterior temperature, the operation mode being selected from a plurality of modes comprising an active first heater mode responsive to analyzing the interior temperature below a first predetermined temperature and an inactive first heater mode responsive to analyzing the exterior temperature below a second predetermined temperature, the second predetermined temperature being lower than the first predetermined temperature, and controlling the first heater and the second heater according to the determined operation mode.

In another exemplary aspect of the present disclosure, a method of operating a recreational vehicle air conditioning unit is provided. The method may include analyzing the interior temperature of the recreational vehicle, analyzing the ambient exterior temperature outside the recreational vehicle, determining an operating mode of the air conditioning unit based on the interior temperature and the ambient exterior temperature, the operation mode being selected from a plurality of modes comprising an active first heater mode responsive to analyzing the interior temperature below a first predetermined temperature and an inactive first heater mode responsive to analyzing the exterior temperature below a second predetermined temperature, the second predetermined temperature being lower than the first predetermined temperature, and controlling the first heater and the second heater according to the determined operation mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
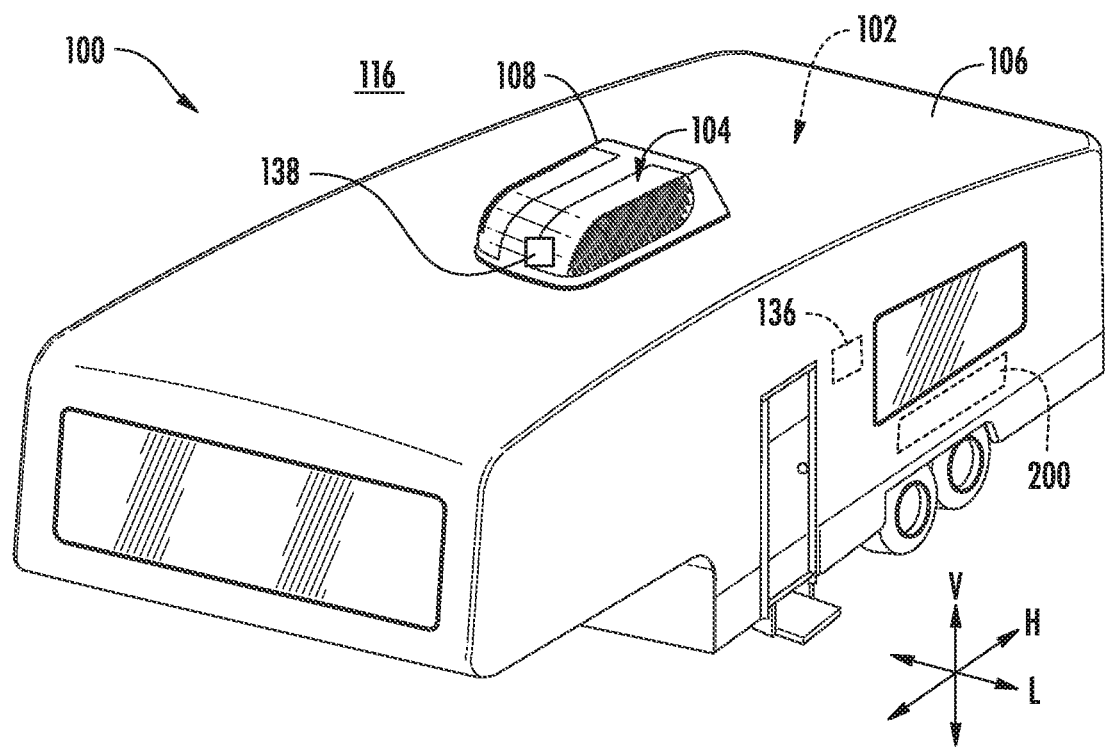
FIG. 1 provides a perspective view of a recreational vehicle according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising."

Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

FIG. 1 provides a perspective view of an exemplary recreational vehicle 100 in accordance with the present disclosure. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment 102 of recreational vehicle 100, climate control of the passenger compartment is desirable.

Accordingly, an air conditioning system or air conditioner 104 may be mounted on recreational vehicle 100 to provide cooled air to the passenger compartment 102. Air conditioning system 104 is typically mounted to an outside surface 106 of recreational vehicle 100. This arrangement is desirable because a byproduct of operation of air conditioning system 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioning system 104 may be mounted on an outer surface 106, such as the ceiling or top of recreational vehicle 100. Also as shown in FIG. 1, air conditioning system 104 may include a top cover or outer grill 108 that is positioned over the working components air conditioning system 104, e.g., to protect such working components from rain, wind, debris, etc. Although an exemplary recreational vehicle is illustrated, it should be appreciated that air conditioner 104 may be used in or with any suitable recreational vehicle.

Figure 2:
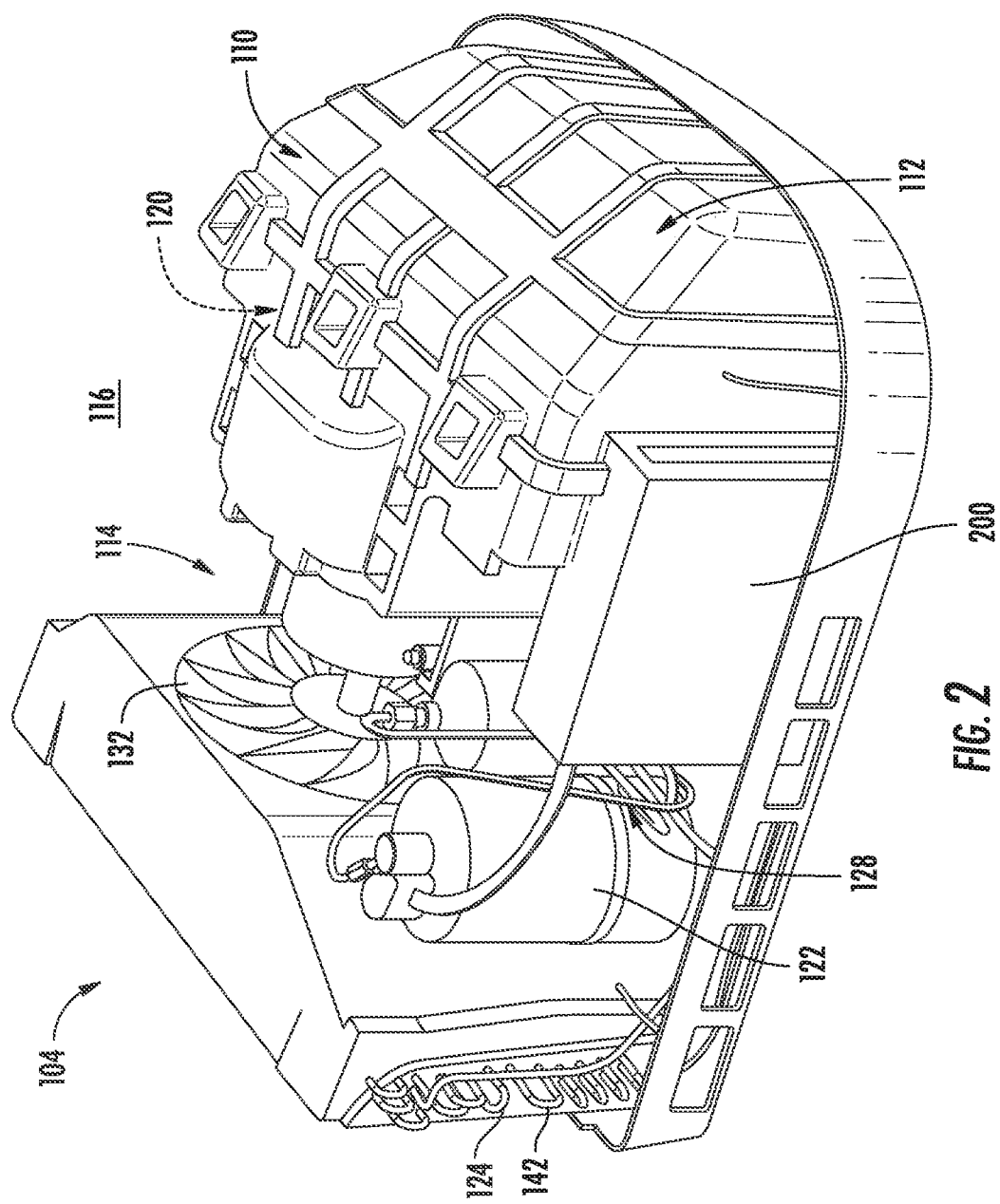
FIG. 2 provides a perspective view of a recreational vehicle air conditioner (RVAC) that may be used with the exemplary recreational vehicle of FIG. 1, with an outdoor cover removed for clarity.
Figure 3:
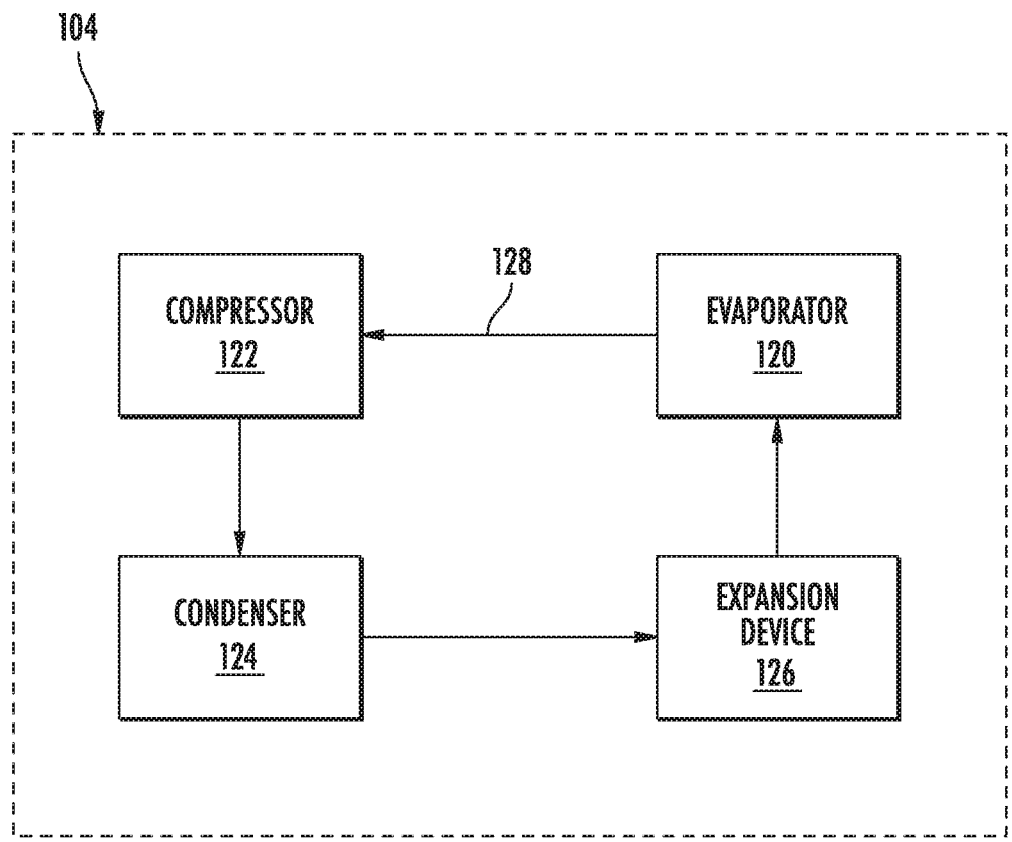
FIG. 3 provides a schematic view of an air conditioning system according to an exemplary embodiment of the present disclosure.

Referring now generally to FIGS. 2 and 3, the operation of air conditioning system 104 will be described in more detail according to exemplary embodiments of the present subject matter. In this regard, FIG. 2 illustrates a top, perspective view of air conditioner 104 of recreational vehicle 100 with outer grill 108 removed to reveal internal working components of air conditioner 104. As illustrated, air conditioning system 104 generally includes an indoor bulkhead or indoor cover 110 that divides air conditioning system 104 between an indoor and outdoor portion. Specifically, indoor cover 110 defines an indoor air plenum 112 and an outdoor air plenum 114. In this regard, indoor cover 110 generally shields the indoor components of air conditioning system 104 from the outdoor environment 116.

In addition, FIG. 3 illustrates a schematic view of air conditioning system 100. Relevant components of air conditioning system 104 will now be described. It should be understood that air conditioning system 104 includes various heat pump components, such as a sealed system, for treating air within an interior of an associated recreational vehicle 100. Such components are well understood by those skilled in the art and a description of such components is omitted for the sake of brevity.

In this regard, for example, air conditioning system 104 includes refrigerant circulating between evaporator (or interior heat exchanger) 120, compressor 122, condenser (or exterior heat exchanger) 124, and expansion device 126, as shown in the refrigeration loop 128 of air conditioning system 104 in FIGS. 2 and 3. Refrigerant, also known as coolant, carries heat from the passenger compartment 102 of recreational vehicle 100 to the outdoor environment 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized. For example, according to an exemplary embodiment, the refrigerant may be R-410A or another refrigerant.

During a refrigerant cycle, the refrigerant may begin by passing through evaporator 120 in liquid form. Ambient air or air from the passenger compartment 102 may pass over evaporator 120, e.g., as motivated by an evaporator fan or air handler. More specifically, air conditioner system 104 may include an indoor fan (not pictured) configured for urging a flow of indoor air. Because the liquid refrigerant is relatively cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well-above the ambient temperature outside of recreational vehicle 100. From compressor 122, the heated refrigerant is delivered to condenser 124. Air may pass over condenser 124, e.g., as motivated from a condenser fan or air handler. More specifically, as illustrated, air conditioning system 104 may include an outdoor fan 132 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process. In some embodiments, evaporator 120 may be referred to as a first heater.

The air conditioner system 104 may further include a second or auxiliary heater 200. The auxiliary heater 200 may be a suitable type of heater to provide auxiliary (i.e., additional) heat to recreational vehicle 100 at times when evaporator 120 is unable to do so on its own. For instance, auxiliary heater may be a gas-powered furnace (e.g., propane, natural gas, etc.), an electric heater, a water boiler heater, or the like. Auxiliary heater 200 may be provided or located in any suitable location on recreational vehicle 100. As shown in FIG. 2, auxiliary heater 200 is located within air conditioning system 104 (e.g., a casing thereof). However, in the case of auxiliary heater 200 being a water boiler or gas-powered furnace, other suitable locations may be used (e.g., a machine room within or below the passenger compartment 102 of the recreational vehicle 100, as shown in phantom lines in FIG. 1).

Auxiliary heater 200 may further include a secondary air circulation system (not shown) to circulate heated air produced by auxiliary heater 200 throughout recreational vehicle 100. For example, in an embodiment in which auxiliary heater 200 is located separately from air conditioning system 104, the secondary air circulation system would also be provided separately from air conditioning system 104. As such, upon activation of auxiliary heater 200, the secondary air circulation system would also be activated to supply the auxiliary heated air to passenger compartment 102 of recreational vehicle 100. In other embodiments however (e.g., electric auxiliary heater or another suitable embodiment wherein auxiliary heater 200 is mounted within air conditioner system 104), heat generated by auxiliary heater 200 may be circulated by the same indoor fan that circulates air over evaporator 120.

Recreational vehicle 100 may further include a controller 140. Controller 140 may control various operations within recreational vehicle, such as air conditioning unit 104 and auxiliary heater 200. Controller 140 may be provided at any suitable location within recreational vehicle 100, and may be operably coupled (e.g., electrically or wirelessly coupled) to air conditioning unit 104 and auxiliary heater 200. Further, controller 140 may be operably coupled to thermostat 170 (FIG. 4), which will be described in further detail below.

In some embodiments, controller 140 includes one or more memory devices and one or more processors. The processors can be any combination of general or special purpose processors, CPUs, or the like that can execute programming instructions or control code associated with operation of recreational vehicle 100. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 140 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 140 includes a network interface such that controller 140 can connect to and communicate over one or more wireless networks with one or more network nodes. Controller 140 can also include one or more transmitting, receiving, or transceiving components for transmitting/receiving communications with other devices communicatively coupled with recreational vehicle 100. Additionally, or alternatively, one or more transmitting, receiving, or transceiving components can be located off board controller 140.

Recreational vehicle 100 may further include an interior temperature sensor 136 provided in passenger compartment 102. During use, interior temperature sensor 136 may generally sense or measure an atmospheric temperature within passenger compartment 102. Interior temperature sensor 136 may then transmit the atmospheric temperature information to controller 140 (e.g., as one or more interior temperature signals). Interior temperature sensor 136 may be any suitable sensor for measuring the temperature of the air (e.g., thermistor, thermostat, etc.). Accordingly, an interior temperature of passenger compartment 102 may be continually monitored (e.g., during activation or use of air conditioner 104).

Recreational vehicle 100 may further include an ambient exterior temperature sensor 138. Ambient exterior temperature sensor 138 may be provided at any suitable location outside of passenger compartment 102, and may be configured to measure a temperature of, for example, outdoor environment 116. During use, ambient exterior temperature sensor 138 may send information relating to the ambient exterior temperature to controller 140 (e.g., as one or more exterior temperature signals). Ambient exterior temperature sensor may be any suitable sensor for measuring the temperature of the air (e.g., thermistor, thermostat, etc.). Accordingly, an exterior temperature of outdoor environment 116 may be continually monitored (e.g., during activation or use of air conditioner 104).

In some embodiment, recreational vehicle 100 may include an exterior heat exchanger temperature sensor 142. The exterior heat exchanger temperature sensor 142 may be attached to exterior heat exchanger (or condenser) 124 and may be configured to monitor a temperature of exterior heat exchanger 124. For example, exterior heat exchanger temperature sensor 142 may be attached to or in contact with refrigeration tubes (not shown) provided in exterior heat exchanger 124. In one example, exterior heat exchanger temperature sensor 142 may sense whether frost has built up on exterior heat exchanger 124. In one example, exterior heat exchanger temperature sensor 142 senses a temperature of refrigerant flowing through the refrigeration tubes. Exterior heat exchanger temperature sensor 142 may then send measurements to controller 140 (e.g., as one or more exterior HE temperature signals). Controller 140 may then determine that the exterior heat exchanger is covered in frost by comparing a measured temperature of the refrigerant with a stored nominal temperature of refrigerant.

Figure 4:
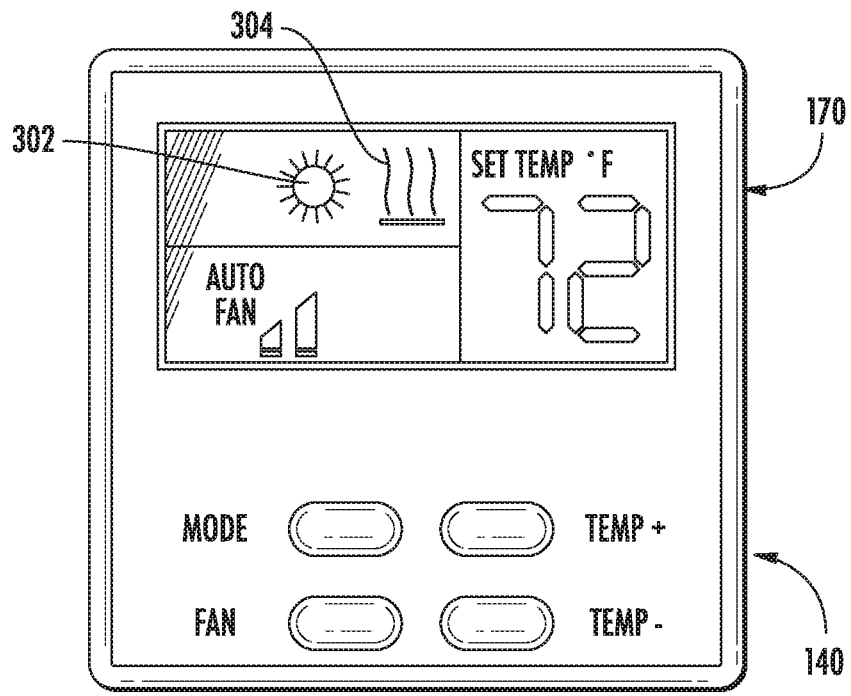
FIG. 4 provides a front view of a thermostat according to an exemplary embodiment of the present disclosure.
Figure 5:
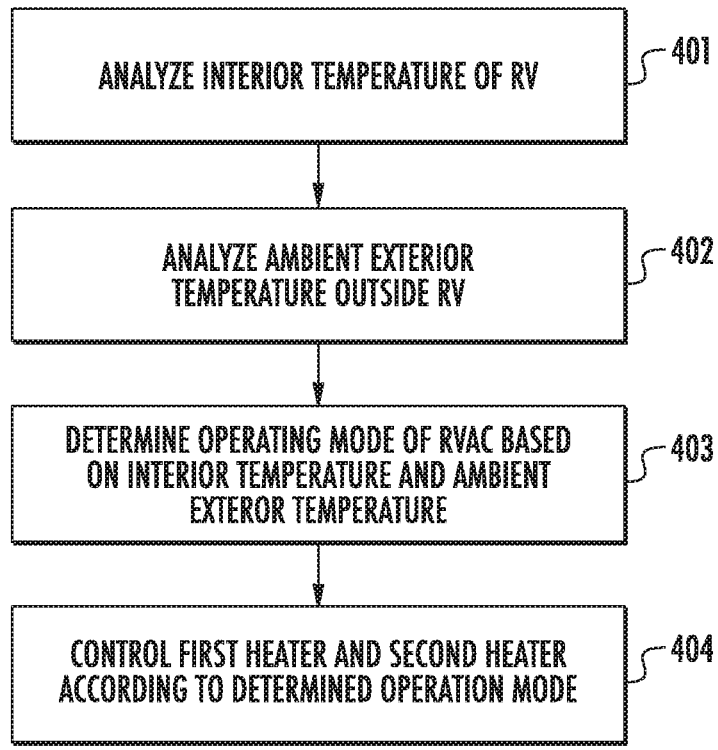
FIG. 5 provides a flow chart illustrating a method of operating an exemplary RVAC according to an embodiment of the present disclosure.

FIG. 4 provides a front view of a thermostat 170 used in an exemplary embodiment of recreational vehicle 100. Thermostat 170 may allow a user to control air conditioning system 104 within recreational vehicle 100. Thermostat 170 may include a screen (e.g., an LCD screen) on which a set temperature or a measured temperature may be displayed. Thermostat 170 may further include one or more control inputs; such as buttons, wheels, or knobs, through which the user may adjust settings. For instance, a user operating thermostat 170 may select a set temperature desired within recreational vehicle 100. Additionally or alternatively, the user may select an operating mode of air conditioning system 104. For example, a user may select a Heat Mode (i.e., to provide heated air to passenger compartment 102) or an Air Conditioning mode (i.e., to provide cooled air to passenger compartment 102). Within the Heat Mode, a user may select a first heater only mode (e.g., heat pump 302 mode) or a dual first-and-second heater mode (e.g., heat pump 302 and furnace 304 mode). A detailed description of the different modes will be described hereinafter.

When a user selects the first heater only mode, the heat pump 302 mode icon may appear on the thermostat 170. Additionally or alternatively the controller 140 may operate the first heater (e.g., evaporator 120) according to certain temperature demands described below, while excluding or halting operation of the auxiliary heater 200. When the user selects the dual first-and-second heater mode, the heat pump 302 mode icon and the furnace 304 mode icon (or second heater mode icon) may appear on the thermostat 170. Additionally or alternatively, the controller 140 may operate each of the first heater 120 and second heater 200 according to certain temperature demands described below. In some embodiments, a user may also select a second heater only mode. In the second heater only mode, the second heater 304 mode icon may appear on the thermostat 170. Additionally or alternatively, the controller 140 may operate the second heater 200 according to certain temperature demands described below.

FIG. 4 is a flow chart describing an exemplary method of operating a recreational vehicle air conditioning (RVAC) system, including an auxiliary heater, such as air conditioner 104. It should be understood that the method described herein may be used by a wide range of air conditioning systems for recreational vehicles, and the association thereof should not be limited. At the outset of the method, a user may input a heating mode into the thermostat defining how the user would like the recreational vehicle to be heated. In other words, the user may activate a heating operation to provide heat to the passenger compartment of the recreational vehicle. In some embodiments, this may include the user inputting a set temperature at which the user desires the passenger compartment to be maintained. Once the thermostat has been activated, the method may proceed to step 401.

Referring to FIG. 4, at step 401, the method may include analyzing an interior temperature of the recreational vehicle. For example, an interior temperature sensor may take a measurement of a temperature of air within the passenger compartment of the recreation vehicle. This temperature measurement may then be sent to the controller. The controller may then compare the interior temperature measurement from the interior temperature sensor with a set temperature input by the user.

At step 402, the method may include analyzing an ambient exterior temperature outside of the recreational vehicle. For example, an ambient exterior temperature sensor may take a measurement of a temperature outside of the recreational vehicle (i.e., an atmospheric temperature). This temperature measurement may then be sent to the controller. The controller may then compare the ambient exterior temperature with both the measured interior temperature and a set temperature input by the user (e.g., prior to 401).

At step 403, the method may include determining an operating mode of the RVAC unit based on both the measured interior temperature and the measured ambient exterior temperature. The operating mode determined by the controller may be based on a mode selected by the user (e.g., first heater only mode, dual first-and-second heater mode, second heater only mode). The operating mode of the RVAC may include an active first heater mode and an inactive first heater mode, which may be determined and used in both the first heater only mode and the dual first-and-second heater mode. In other words, the controller may determine whether to run the first heater (e.g., the evaporator) according to certain scenarios.

At step 404, the method may include controlling the first heater and the second heater according to the determined operation mode. In other words, the controller may determine whether to activate the first heater only, the first heater and the second heater together, or the second heater only.

According to one embodiment, when the user selects the first heater only mode and when the interior temperature sensor senses an interior temperature less than the set temperature input by the user, the controller may control the first heater to run (i.e., circulate refrigerant through the evaporator as motivated by the compressor). It should be understood that in both the first heater only mode and the dual first-and-second heater mode, the controller may activate the first heater when the measured interior temperature is less than the set temperature by a first predetermined amount, for example about 0.5° C. below the set temperature. The first predetermined amount may be any reasonable amount to allow a regular cycle of "ON" and "OFF" to be performed by the air conditioning system between temperature values. The controller may also analyze the ambient exterior temperature. For example, when the ambient exterior temperature is less than a predetermined temperature, the controller may deactivate the first heater (e.g., the evaporator by halting the compressor). The predetermined temperature may be set by the user or may be preprogrammed into the thermostat. In some embodiments, the predetermined temperature may be about 0° C., may be about −4° C., may be about −8° C. It should be understood that the predetermined temperature may be any reasonable temperature at which the first heater (e.g., the evaporator) would be ineffective. Accordingly, the controller may determine that the first heater is run when the measured interior temperature is less than a set temperature input by the user and when the measured ambient exterior temperature is above the predetermined temperature.

When the user selects the dual first-and-second heater mode, and when the interior temperature senses the interior temperature less than the set temperature input by the user, the controller may control the first heater to run (i.e., circulate refrigerant through the evaporator). Additionally, when the user selects the dual first-and-second heater mode and the ambient exterior temperature is less than the predetermined temperature, the controller may deactivate the first heater (i.e., the evaporator) and may activate the second heater (i.e., the auxiliary heater). Accordingly, heat may be supplied to the passenger compartment of the recreational vehicle by the auxiliary heater while the evaporator is deactivated.

Additionally or alternatively, when the user selects the dual first-and-second heater mode, the ambient exterior temperature is greater than the predetermined temperature, and the measured interior temperature is less than the set temperature by a second amount greater than the first amount, the controller activates the first heater and activates the second heater. For example, the second amount may be about 1.5° C., may be about 3° C., may be about 4.5° C. Accordingly, when the interior temperature is sufficiently low (i.e., less than the preset temperature by at least the second amount), the controller activates both the first heater and the second heater.

Additionally or alternatively, when the user selects the first heater only mode and the ambient exterior temperature is less than the predetermined temperature, the controller may deactivate the first heater (i.e., halt circulation of refrigerant through the evaporator). Accordingly, the recreational vehicle can advantageously avoid operating the first heater inefficiently and thus conserve energy.

In some embodiments, the controller may receive information from an exterior heat exchanger temperature sensor, such as that described above. The exterior heat exchanger temperature sensor may measure a temperature of the exterior heat exchanger associated with the first heater, and send the temperature measurement to the controller. The controller may then analyze the temperature measurement and determine whether the exterior heat exchanger is covered in frost and therefore either inoperable or inefficient in generating heat to heat the recreational vehicle. For example, the exterior heat exchanger temperature sensor may sense a temperature of refrigerant flowing through refrigerant tubes within the exterior heat exchanger and send the resultant temperature measurement to the controller. The controller may then compare the measured temperature to a stored nominal temperature and determine that the exterior heat exchanger is covered in frost when the measured temperature lower than the nominal temperature.

When the controller determines that the exterior heat exchanger is covered in frost, the controller may deactivate the first heater (i.e., halt circulation of refrigerant through the evaporator). The controller may deactivate the first heater when the user has selected the first heater only mode and when the user has selected the dual first-and-second heater mode. Further, when the user has selected the dual first-and-second heater mode, the controller may activate the second heater. Accordingly, the second heater may automatically be activated when the controller determines that the exterior heat exchanger is covered in frost.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioning unit for a recreational vehicle, comprising:
    a controller;
    a sealed system operably coupled to the controller and configured for circulating refrigerant, the sealed system comprising a first heater to provide heat to the recreational vehicle;
    a second heater operably coupled to the controller and attachable to the recreational vehicle to selectively provide auxiliary heat to the recreational vehicle;
    an interior temperature sensor operably coupled to the controller to sense an interior temperature of the recreational vehicle; and
    an ambient exterior temperature sensor operably coupled to the controller to sense an ambient exterior temperature outside the recreational vehicle; wherein the controller is configured to initiate a heating operation comprising
        analyzing the interior temperature of the recreational vehicle,
        analyzing the ambient exterior temperature outside the recreational vehicle,
        determining an operating mode of the air conditioning unit based on the interior temperature and the ambient exterior temperature, the operation mode being selected from a plurality of modes comprising an active first heater mode responsive to analyzing the interior temperature below a first predetermined temperature and an inactive first heater mode responsive to analyzing the ambient exterior temperature below a second predetermined temperature, the second predetermined temperature being lower than the first predetermined temperature, and
        controlling the first heater and the second heater according to the determined operation mode, wherein the active first heater mode comprises a first heater only mode and a dual first-and-second heater mode, and
        wherein analyzing the ambient exterior temperature comprises analyzing the ambient exterior temperature below a third predetermined temperature, and wherein controlling the first heater and the second heater according to the determined mode comprises halting activation of the first heater in the first heater only mode in response to analyzing the ambient exterior temperature below the third predetermined temperature.

2. The air conditioning unit of claim 1, wherein the inactive first heater mode comprises a second heater only mode.

3. The air conditioning unit of claim 2, wherein analyzing the ambient exterior temperature comprises analyzing the ambient exterior temperature below the third predetermined temperature, and wherein controlling the first heater and the second heater according to the determined mode comprises halting activation of the first heater and activating the second heater in the dual first-and-second heater mode in response to analyzing the ambient exterior temperature below the third predetermined temperature.

4. The air conditioning unit of claim 2, wherein analyzing the interior temperature comprises analyzing the interior temperature below a fourth predetermined temperature, and wherein controlling the first heater and the second heater according to the determined mode comprises activating the first heater and the second heater in the dual first-and-second heater mode in response to analyzing the interior temperature below the fourth predetermined temperature.

5. The air conditioning unit of claim 1, wherein the first heater is a heat pump comprising an interior heat exchanger provided inside the recreational vehicle and an exterior heat exchanger in fluid communication with the interior heat exchanger and provided outside the recreational vehicle, and wherein the air conditioning unit further comprises an exterior heat exchanger temperature sensor attached to the exterior heat exchanger and configured to sense frost on the exterior heat exchanger.

6. The air conditioning unit of claim 5, wherein the exterior heat exchanger temperature sensor is operably coupled to the controller, and wherein the heating operation further comprises:
    sensing frost at the exterior heat exchanger temperature sensor; and
    halting activation of the first heater in response to sensing frost on the exterior heat exchanger.

7. The air conditioning unit of claim 6, wherein the heating operation further comprises:
    activating the second heater in response to sensing frost on the exterior heat exchanger.

8. The air conditioning unit of claim 1, wherein the second heater comprises a propane furnace, an electric heater, or a water boiler.

9. A method of operating a recreational vehicle air conditioning unit comprising a first heater attached to the recreational vehicle, a second heater attached to the recreational vehicle, an interior temperature sensor provided inside the recreational vehicle, and an ambient exterior temperature sensor attached to an exterior of the recreational vehicle, the method comprising:
    analyzing the interior temperature of the recreational vehicle;
    analyzing the ambient exterior temperature outside the recreational vehicle;
    determining an operating mode of the air conditioning unit based on the interior temperature and the ambient exterior temperature, the operation mode being selected from a plurality of modes comprising an active first heater mode responsive to analyzing the interior temperature below a first predetermined temperature and an inactive first heater mode responsive to analyzing the ambient exterior temperature below a second predetermined temperature, the second predetermined temperature being lower than the first predetermined temperature; and
    controlling the first heater and the second heater according to the determined operation mode, wherein the active first heater mode comprises a first heater only mode and a dual first-and-second heater mode, and
    wherein analyzing the interior temperature comprises analyzing the interior temperature below a third predetermined temperature, and wherein controlling the first heater and the second heater according to the determined mode comprises activating the first heater and the second heater in the dual first-and-second heater mode in response to analyzing the interior temperature below the third predetermined temperature.

10. The method of claim 9, wherein the inactive first heater mode comprises a second heater only mode.

11. The method of claim 10, wherein analyzing the ambient exterior temperature comprises analyzing the ambient exterior temperature below a fourth predetermined temperature, and wherein controlling the first heater and the second heater according to the determined mode comprises halting activation of the first heater in the first heater only mode in response to analyzing the ambient exterior temperature below the fourth predetermined temperature.

12. The method of claim 10, wherein analyzing the ambient exterior temperature comprises analyzing the ambient exterior temperature below a fourth predetermined temperature, and wherein controlling the first heater and the second heater according to the determined mode comprises halting activation of the first heater and activating the second heater in the dual first-and-second heater mode in response to analyzing the ambient exterior temperature below the fourth predetermined temperature.

13. The method of claim 9, wherein the first heater is a heat pump comprising an interior heat exchanger provided inside the recreational vehicle and an exterior heat exchanger in fluid communication with the interior heat exchanger and provided outside the recreational vehicle, and wherein the air conditioning unit further comprises an exterior heat exchanger temperature sensor attached to the exterior heat exchanger and configured to sense frost on the exterior heat exchanger.

14. The method of claim 13, wherein the exterior heat exchanger temperature sensor is operably coupled to the controller, and wherein the heating operation further comprises:
    sensing frost at the exterior heat exchanger temperature sensor; and
    halting activation of the first heater in response to sensing frost on the exterior heat exchanger.

15. The method of claim 14, wherein the heating operation further comprises:
    activating the second heater in response to sensing frost on the exterior heat exchanger.

16. The method of claim 9, wherein the second heater comprises a propane furnace, an electric heater, or a water boiler.

* * * * *